(12) United States Patent
Lee

(10) Patent No.: US 12,284,124 B2
(45) Date of Patent: Apr. 22, 2025

(54) NETWORK CONTROL METHOD AND CHIP

(71) Applicant: REALTEK SEMICONDUCTOR CORPORATION, Hsinchu (TW)

(72) Inventor: Chen-Wei Lee, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 389 days.

(21) Appl. No.: 17/814,239

(22) Filed: Jul. 22, 2022

(65) Prior Publication Data

US 2023/0104825 A1 Apr. 6, 2023

(30) Foreign Application Priority Data

Oct. 1, 2021 (TW) ................................ 110136690

(51) Int. Cl.
*H04L 5/00* (2006.01)
*H04W 72/0446* (2023.01)

(52) U.S. Cl.
CPC ............ *H04L 5/001* (2013.01); *H04L 5/0012* (2013.01); *H04L 5/005* (2013.01); *H04W 72/0446* (2013.01)

(58) Field of Classification Search
CPC ....... H04L 5/001; H04L 5/0012; H04L 5/005; H04W 72/0446
See application file for complete search history.

(56) References Cited

U.S. PATENT DOCUMENTS

| 8,014,435 B2 | 9/2011 | Brink et al. |
| 2014/0247797 A1* | 9/2014 | Monzen ............. H04W 72/542 370/329 |

FOREIGN PATENT DOCUMENTS

| CN | 112689308 A | * 4/2021 |
| CN | 113472496 A | * 10/2021 |
| TW | I361589 B | 4/2012 |

OTHER PUBLICATIONS

English Abstract Translation of TWI361589B.

* cited by examiner

*Primary Examiner* — Duc C Ho
(74) *Attorney, Agent, or Firm* — WPAT, P.C.; Anthony King

(57) ABSTRACT

A network control method is configured to control the transfer to stations connected to an access point or a router under an orthogonal frequency division multiple access (OFDMA) method. The network control method includes: obtaining first specification parameters of the stations; grouping the stations into a first group and a second group according to the first specification parameters; transferring with the stations belonging to the first group during a first period; and transferring with the stations belonging to the second group during a second period. The first period is different from the second period.

20 Claims, 4 Drawing Sheets

NETWORK CONTROL METHOD AND CHIP

CROSS-REFERENCE TO RELATED APPLICATIONS

This application claims the benefit of priority to Patent Application No. 110136690, filed in Taiwan on Oct. 1, 2021, which is incorporated by reference in its entirety.

TECHNICAL FIELD

The present application relates to a network control method and chip, particularly to a network control method and chip for controlling transmission between the router and stations.

BACKGROUND

In the WiFi6 application scenario, in order to enhance the transmission efficiency, when an access point (AP)/router and multiple stations (STA) transmit at the same time, an orthogonal frequency division multiple access (OFDMA) is supported. However, when the number of stations increases, it is not possible to transmit with all stations at the same time even using the OFDMA method. Therefore, the scheduling of station transmission is becoming more and more important.

SUMMARY OF THE INVENTION

An aspect of the present disclosure provides a network control method configured to control a transmission with a plurality of stations connected to an access point/router under the OFDMA method. The network control method includes: obtaining a plurality of first specification parameters of the plurality of stations, respectively; grouping the plurality of stations into a first group and a second group according to the plurality of first specification parameters; transferring with the stations belonging to the first group using the OFDMA method during a first time period; and transferring with the stations belonging to the second group using the OFDMA method during a second time period. The first time period differs from the second time period.

Another aspect of the present disclosure provides a network control chip configured to control a transmission with a plurality of stations connected to an access point/router under the OFDMA method. The network control chip is disposed in the access point/router. The network control chip includes a transceiver and a processor. The transceiver is configured to receive a plurality of first specification parameters of the plurality of stations, respectively. The processor is configured to group the plurality of stations into a first group and a second group according to the plurality of first specification parameters, transferring with the stations belonging to the first group using the OFDMA method during a first time period, and transferring with the stations belonging to the second group using the OFDMA method during a second time period. The first time period differs from the second time period.

Compared with the conventional technology, the network control method and chip of the present disclosure group stations according to their specifications, support capability and/or historical average traffic, so that stations with similar performances can transmit at the same time or stations with special needs can have a transmission opportunity more appropriately to maintain the overall transmission efficiency.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
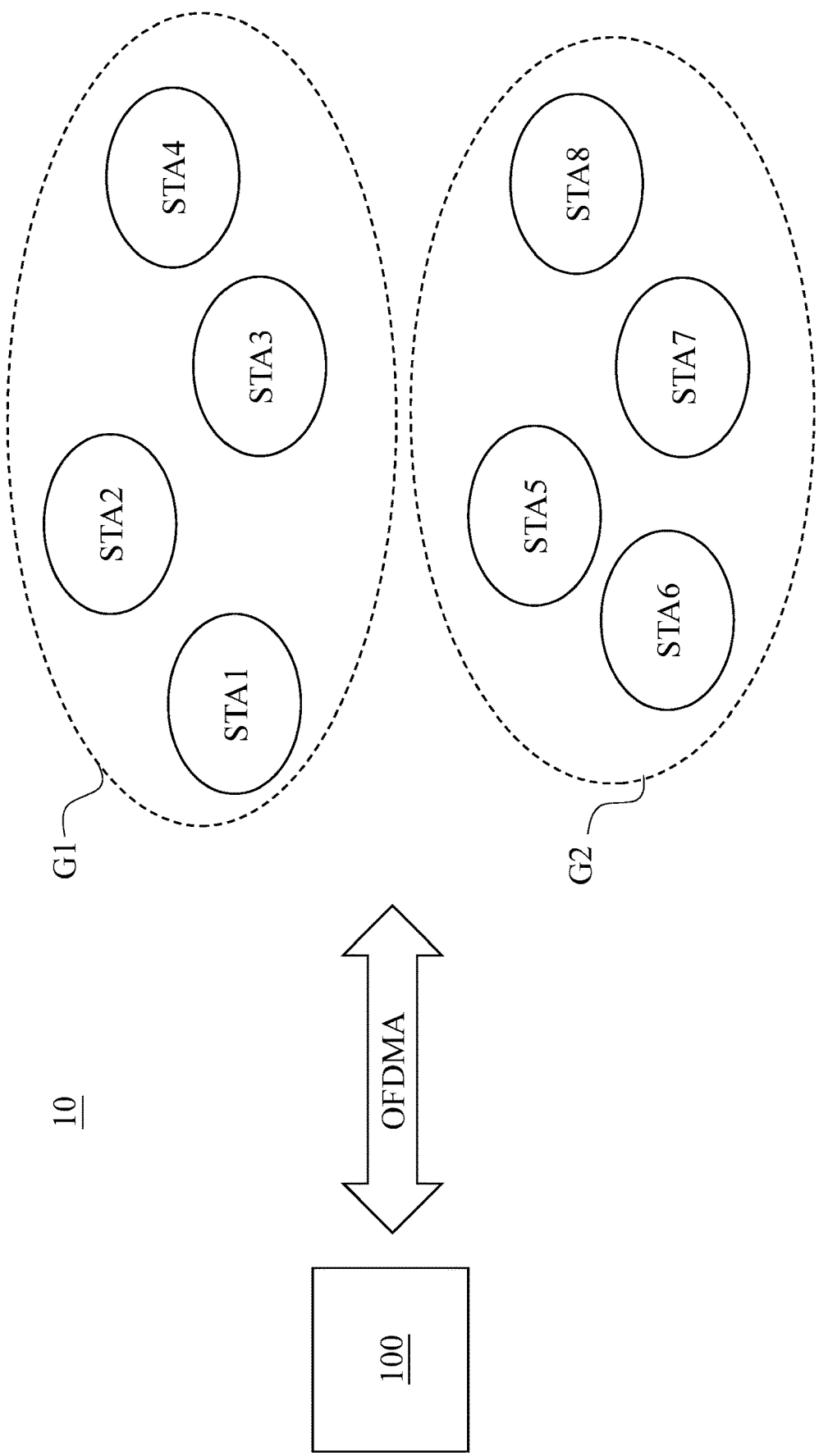
FIG. 1 is a schematic diagram illustrating a network transmission system according to some embodiments of the present disclosure.

FIG. 1 is a schematic diagram illustrating a network transmission system 10 according to some embodiments of the present disclosure. The network transmission system 10 can use multiple access methods to perform transmission between an access point (AP)/router 100 and a plurality of stations STA1-STA8. These access method can be, for example, but are not limited to, code division multiple access (CDMA), time division multiple access (TDMA), frequency division multiple access (FDMA), orthogonal frequency division multiple access (OFDMA), single carrier frequency division multiple access (SC-FDMA), etc. In some embodiments, the stations STA1-STA8 support WiFi6 standard (or IEEE 802.11ax standard).

When using the OFDMA method for transmission, the AP/router 100 can simultaneously performs transmission with many stations during a single time period to increase transmission efficiency. However, when the specifications and/or performances of the stations transmitting with the AP/router 100 during the same time period differ significantly, the transmission efficiency needs to accommodate the stations with lower specifications and/or performance, thereby downgrading the overall transmission efficiency and further offsetting the benefits of using the OFDMA method.

In view of the foregoing, in the present disclosure, before the AP/router 100 and the stations STA1-STA8 use the OFDMA method to perform transmission, the AP/router 100 will collect the information of the stations STA1-STA8, so as to group the stations STA1STA8, e.g., grouping into a group G1 and a group G2 as shown in FIG. 1. In some embodiments, the stations STA1-STA8 belonging to the same group G1/G2 have similar specifications and/or similar performances, so as to maintain the transmission efficiency of using the OFDMA method. Specifically, when the stations STA1-STA4 are assigned to the group G1 and the stations STA5-STA8 are assigned to the group G2, the stations STA1-STA4 perform transmission with the AP/router 100 during a first time period, whereas the stations STA5-STA8 perform transmission with the AP/router 100 during a second time period different from the first time period.

Figure 2:
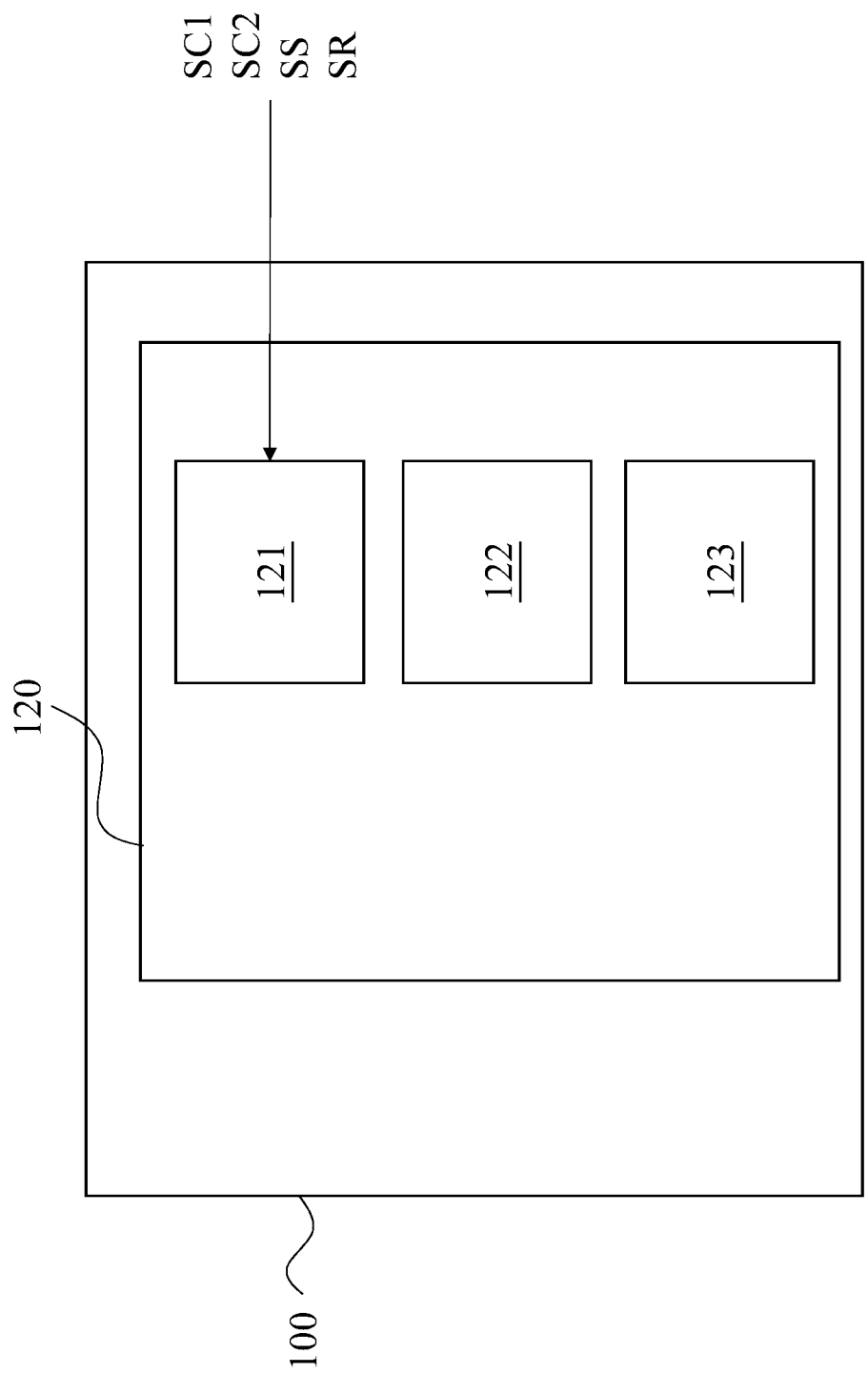
FIG. 2 is a schematic diagram illustrating an access point/router according to some embodiments of the present disclosure.

Reference is made to FIG. 2. FIG. 2 is a schematic diagram illustrating the AP/router 100 according to some embodiments of the present disclosure. The AP/router 100 includes a network control chip 120, configured to determine the grouping of the stations STA1-STA8 when employing the OFDMA method and control the transmission between the AP/router 100 and the stations STA1-STA8. The network control chip 120 includes a transceiver 121, a processor 122 and a memory 123. The above-mentioned transceiver 121 can be implemented using a circuit capable of transmitting and receiving.

After the stations STA1-STA8 connect to the AP/router 100 and before employing the OFDMA method, the transceiver 121 is configured to receive the specification parameter SC1, the support parameter SS and the reference traffic SR transmitted from the stations STA1-STA8. Specifically, the stations STA1-STA8 notify the network control chip 120 the hardware specifications and support capability thereof via the specification parameter SC1 and the support parameter SS. In the present embodiment, the specification parameter SC1 is the bandwidth of each of the stations STA1-STA8. The reference traffic SR is the average traffic of each of the stations STA1-STA8 during a past period. In some embodiments, the support parameter SS of each of the stations STA1-STA8 is configured to indicate whether it supports the space-time block code (STBC). The present disclosure is not limited to the above-mentioned support capabilities, and various support capabilities of each stations is within the contemplated scope of the present disclosure. For example, the support parameter SS can be configured to indicate whether it supports the dual carrier modulation (DCM), the Doppler/Midamble feedback mechanism and/or the pre-forward error correction (pre-FEC) padding factor.

The memory 123 is configured to store the specification parameter SC1, support parameter SS and reference traffic SR of each station; in some embodiments, the memory 123 can be external to the network control chip 120. The processor 122 is configured to group the stations STA1-STA8 according to specification parameter SC1. The processor 122 obtains the respective bandwidth of the stations STA1-STA8 from the specification parameter SC1, and ranks the stations STA-~STA8 according to the bandwidths. Take FIG. 1 for example, the processor 122 groups the four stations STA1-STA4 having the smaller bandwidths into the group G1, and groups the four stations STA5-STA8 having the larger bandwidth into the group G2. In other words, the stations STA1-STA4 belonging to the group G1 have similar bandwidths, and the stations STA5-STA8 belonging to the group G2 have similar bandwidths. Therefore, when using the OFDMA method for transmission, the AP/router 100 can perform transmission with the stations STA1-STA4 having similar bandwidths and the stations STA5-STA8 STA4 having similar bandwidths during the first time period and the second time period, respectively. After the processor 122 determines the grouping of the stations STA1-STA8, the grouping information is stored in the memory 123, so that the transmission can be performed according to the grouping information at a later time.

In some embodiments, in addition to the specifications of the stations STA1-STA8 (such as the above-mentioned bandwidth), the support capability of the stations STA1-STA8 also affects the performance of OFDMA transmission. In this case, the processor 122 is further configured to group the stations STA1-STA8 according to the support parameter SS. For example, the processor 122 learns that the stations STA1, STA2, STA5 and STA6 support STBC and the stations STA3, STA4, STA7 and STA8 do not support STBC via the support parameter SS; hence, processor 122 can further divide the groupings in FIG. 1 into four groups considering both the specification parameter SC1 and the support parameter SS, so that the stations STA1-STA2 are grouped together, the stations STA3-STA4 are grouped together, the stations STA5-STA6 are grouped together, and the stations STA7-STA8 are grouped together. In this way, the stations in each group have similar bandwidths and the same support capability.

In some embodiments, in addition to the specification parameter SC1, the transceiver 121 is further configured to receive other specification-related parameters transferred from the stations STA1-STA8. For example, the specification parameter SC2; in the present embodiment, the specification parameter SC2 is a modulation and coding scheme (MCS) indicator of each station, which is configured to represent the respective transmission power of each of the stations STA1-STA8. For example, a higher MCS indicator represents a lower transmission power. In order to avoid the high packet error rate caused by the large difference in transmission power used by each station in the same group, the processor 122 further groups stations STA1-STA8 according to the specification parameter SC2. For example, stations STA1 to STA3, stations STA4 to STA6, and stations STA7 to STA8 each have similar MCS indicators, and processor 122 accordingly groups stations STA1 to STA3 together, stations STA4 to STA6 together, and stations STA7 to STA8 together so that the transmission power of stations in each group is similar to each other. In some embodiments, the processor 122 controls the AP/router 100 to use the lowest of the transmission powers of the stations in the same group as the transmission power for transmission to that group. For example, if stations STA1 to STA3 are grouped into the same group and station STA1 has the lowest transmission power among them, the processor 122 controls the AP/router 100 to use the transmission power of station STA1 as the transmission power for transmission to that group.

In some embodiments, the transmission rate of stations STA1-STA8 is related to the transmission power; i.e., the stations belonging to the same group have similar transmission rate. In some embodiments, lower transmission rates have higher transmission powers.

In some embodiments, the distance of stations STA1-STA8 relative to AP/router 100 is related to the transmission power; that is, the distance of stations within the same group with respect to the AP/router 100 are similar to each other. In some embodiments, a shorter distance has a lower transmission power.

In some embodiments, some of the stations in each group overlap, and/or some of the stations are not assigned to any of the groups. For example, station STA4 in FIG. 3 has a much higher reference traffic SR than the other stations (e.g., the largest of these reference traffic SR) and is determined to be time-critical. Assigning the station STA4 to only one of the group G1 and the group G2 will not satisfy its traffic requirements. Therefore, processor 122 can also flexibly assign station STA4 to both groups G1 and G2 so that station STA4 can have more time slots to transmit with AP/router 100.

Further, for example, when the number of stations assigned to a group exceeds an upper limit of the load capacity of the groups G1 and G2 (e.g., the upper limit is 4 in FIG. 3), the processor 122 determines which stations are to be removed from the group based on a priority ranking. For example, in FIG. 3, the processor 122 may determine that the station STA8 should be independent of groups G1 and G2 based on the reference traffic SR, i.e., the station STA8 does not belong to groups G1 and G2. In some embodiments, when the number of stations assigned in the group exceeds the upper limit, the processor 122 removes the station with the minimum reference traffic SR from the group until the number of stations assigned in the group does not exceed the upper limit.

Figure 3:
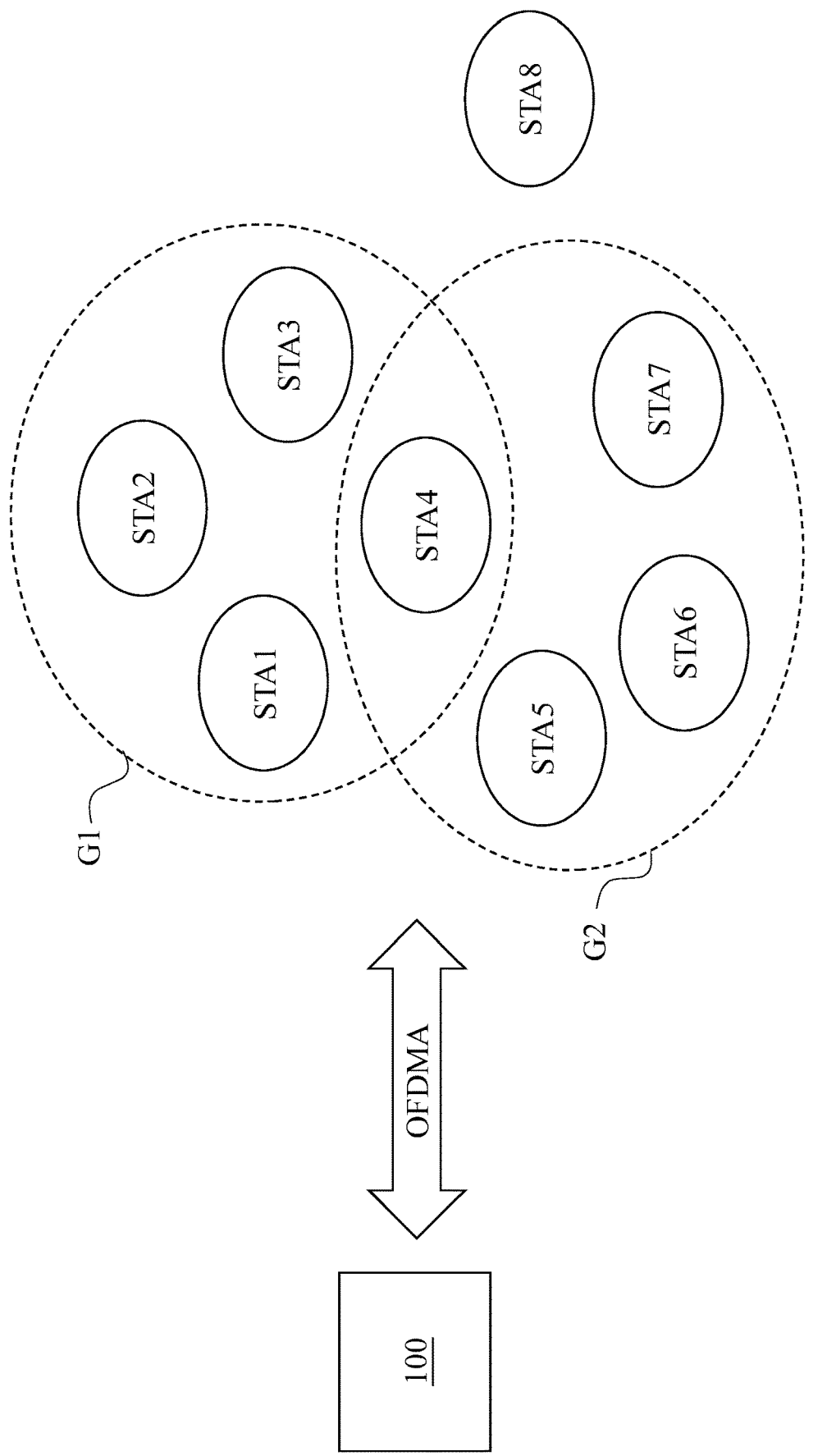
FIG. 3 is a schematic diagram illustrating a network transmission system according to other embodiments of the present disclosure.

In some embodiments, the station STA8 in FIG. 3 may also not be assigned to either the group G1 or the group G2 because it does not support the OFDMA method (e.g., does not support the IEEE 802.11ax standard). When the station STA8 that is not assigned to a group needs to transmit with the AP/router 100, it may transmit with the AP/router 100 alone by a method other than the OFDMA method.

The processor 122 may determine the priority ranking of stations STA1-STA8 to join the group based the specification parameter SC1, the specification parameter SC, the support degree parameter SS2, the reference traffic SR, or the combinations thereof.

In some embodiments, the number of stations STA1-STA8 and the recent average traffic of stations STA1-STA8 change over time, and the support capability of stations STA1-STA8 may be adjusted according to the demand of the user. In response to these changes, the processor 122 is used to update the grouping of stations. Specifically, when the number of stations STA1-STA8, the recent average traffic rate and/or the support capability change, the transceiver 121 receives the updated specification parameter SC1, the updated specification parameter SC2, the updated support capability parameter SS and/or the updated reference traffic rate SR, and the processor 122 regroups stations STA1-STA8 according to the updated specification parameter SC1, the updated specification parameter SC2, the updated support level parameter SS and/or the updated reference traffic rate SR.

Figure 4:
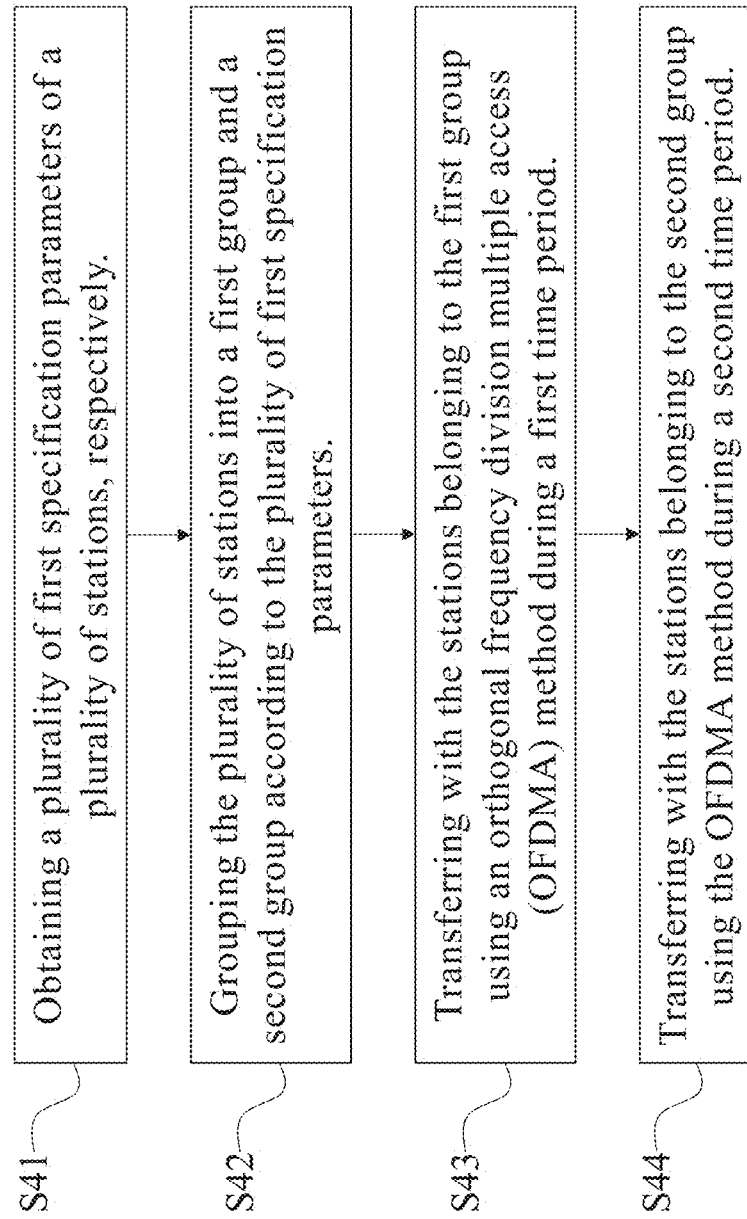
FIG. 4 is a flow chart of a network control method 40 according to some embodiments of the present disclosure.

FIG. 4 is a flow chart of a network control method 40 according to some embodiments of the present disclosure. The network control method 40 is configured to control a transmission with a plurality of stations connected to an access point or a router under an OFDMA method. The network control method 40 incudes operations S41, S42, S43, and S44. In operation S41, a plurality of first specification parameters of the plurality of stations are obtained, respectively. In operation S42, the plurality of stations are grouped into a first group and a second group according to the plurality of first specification parameters. In operation S43, the stations belonging to the first group are transferred with using the OFDMA method during a first time period. In operation S44, the stations belonging to the second group are transferred with using the OFDMA method during a second time period. In some embodiments, the first time period differs from the second time period.

The foregoing description briefly sets forth the features of some embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A network control method, configured to control a transmission with a plurality of stations connected to an access point or a router under an orthogonal frequency division multiple access (OFDMA) method, comprising:
    obtaining a plurality of first specification parameters of the plurality of stations, respectively;
    grouping the plurality of stations into a first group and a second group according to the plurality of first specification parameters;
    transferring with the stations belonging to the first group using the OFDMA method during a first time period; and
    transferring with the stations belonging to the second group using the OFDMA method during a second time period,
    wherein the first time period differs from the second time period.

2. The network control method of claim 1, wherein the plurality of first specification parameters is bandwidths of the plurality of stations.

3. The network control method of claim 2, further comprising:
    generating a ranking according to the bandwidths of the plurality of stations,
    wherein in the step of grouping the plurality of stations into the first group and the second group according to the plurality of first specification parameters, grouping the plurality of stations into the first group and the second group according to the ranking, wherein the bandwidths of the stations belonging to the first group are similar to each other, and the bandwidths of the stations belonging to the second group are similar to each other.

4. The network control method of claim 1, further comprising:
    obtaining a plurality of second specification parameters of the plurality stations, respectively, wherein the plurality of second specification parameters are modulation and coding scheme (MCS) indicators of the plurality of stations, wherein the MCS indicators are configured to respectively represent a transmission power of the plurality of stations.

5. The network control method of claim 4, wherein in the step of grouping the plurality of stations into the first group and the second group according to the plurality of first specification parameters, the plurality of stations are grouped into the first group and the second group further according to the MCS indicators of the plurality of stations.

6. The network control method of claim 5, wherein in the step of transferring with the stations belonging to the first group using the OFDMA method during the first time period, a lowest transmission power of the transmission powers of the stations belonging to the first group is used to perform transmission with the stations belonging to the first group.

7. The network control method of claim 1, further comprising:
    obtaining a plurality of reference traffics of the plurality of stations, wherein the plurality of reference traffics respectively represent the average traffics of the plurality of stations.

8. The network control method of claim 7, wherein the plurality of stations comprise a high-traffic station, wherein the reference traffic of the high-traffic station is the largest among the plurality of reference traffics, wherein in the step of grouping the plurality of stations into the first group and the second group according to the plurality of first specification parameters, the high-traffic station is assigned to the first group and the second group at the same time.

9. The network control method of claim 7, wherein the plurality of stations comprise a low-traffic station, wherein the reference traffic of the low-traffic station is the lowest among the plurality of reference traffics, wherein in the step of grouping the plurality of stations into the first group and the second group according to the plurality of first specification parameters, when a number of stations assigned to the first group and a number of stations assigned to the second group both reach a predetermined upper limit, the low-traffic station is not assigned to the first group and the second group.

10. The network control method of claim 1, further comprising:

obtaining a plurality of support parameters of the plurality of stations, respectively; and re-grouping the plurality of stations into the first group and the second group according to the plurality of support parameters and the plurality of first specification parameters.

11. A network control chip, configured to control a transmission with a plurality of stations connected to an access point or a router under an orthogonal frequency division multiple access (OFDMA) method, wherein the network control chip is disposed in the access point or the router, comprising:

a transceiver, configured to receive a plurality of first specification parameters of the plurality of stations, respectively; and a processor, configured to group the plurality of stations into a first group and a second group according to the plurality of first specification parameters, transferring with the stations belonging to the first group using the OFDMA method during a first time period, and transferring with the stations belonging to the second group using the OFDMA method during a second time period, wherein the first time period differs from the second time period.

12. The network control chip of claim 11, wherein the plurality of first specification parameters is bandwidths of the plurality of stations.

13. The network control chip of claim 12, wherein the processor configured to generate a ranking according to the bandwidths of the plurality of stations, and group the plurality of stations into the first group and the second group according to the ranking, wherein the bandwidths of the stations belonging to the first group are similar to each other, and the bandwidths of the stations belonging to the second group are similar to each other.

14. The network control chip of claim 11, wherein the processor is further configured to obtain a plurality of second specification parameters of the plurality stations, respectively, wherein the plurality of second specification parameters are modulation and coding scheme (MCS) indicators of the plurality of stations, wherein the MCS indicators are configured to respectively represent transmission powers of the plurality of stations.

15. The network control chip of claim 14, wherein the processor groups the plurality of stations into the first group and the second group further according to the MCS indicators of the plurality of stations.

16. The network control chip of claim 15, wherein in the first time period, the processor is further configured to use a lowest transmission power of the transmission powers of the stations belonging to the first group to perform transmission with the stations belonging to the first group.

17. The network control chip of claim 11, wherein the processor configured to obtain a plurality of reference traffics of the plurality of stations, wherein the plurality of reference traffics respectively represent the average traffics of the plurality of stations.

18. The network control chip of claim 17, wherein the plurality of stations comprise a high-traffic station, wherein the reference traffic of the high-traffic station is the largest among the plurality of reference traffics, wherein the processor is configured to assign the high-traffic station to the first group and the second group at the same time.

19. The network control chip of claim 17, wherein the plurality of stations comprise a low-traffic station, wherein the reference traffic of the low-traffic station is the lowest among the plurality of reference traffics, wherein when a number of stations assigned to the first group and a number of stations assigned to the second group reach a predetermined upper limit, the processor is configured to isolate the low-traffic station from the first group and the second group.

20. The network control chip of claim 11, wherein the processor is further configured to obtain a plurality of support parameters of the plurality of stations using the transceiver, and re-group the plurality of stations into the first group and the second group according to the plurality of support parameters and the plurality of first specification parameters.

* * * * *